March 31, 1953 E. P. G. WRIGHT 2,633,501

LONG DISTANCE TELEPHONE EXCHANGE SYSTEM

Filed Aug. 6, 1947 2 SHEETS—SHEET 1

INVENTOR.
ESMOND PHILIP GOODWIN WRIGHT
BY
Robert Harding Jr.
ATTORNEY

INVENTOR.
ESMOND PHILIP GOODWIN WRIGHT
BY
Robert Harding Jr.
ATTORNEY

Patented Mar. 31, 1953

2,633,501

UNITED STATES PATENT OFFICE 2,633,501

LONG DISTANCE TELEPHONE EXCHANGE SYSTEM

Esmond Philip Goodwin Wright, London, England, assignor to International Standard Electric Corporation, New York, N. Y., a corporation of Delaware Application August 6, 1947, Serial No. 766,636
In Great Britain March 9, 1946

5 Claims. (Cl. 179—27)

This invention relates to long distance telephone exchange systems.

The object of the invention is to facilitate the automatic setting up of international connections between subscribers in different countries.

The main feature of the invention comprises an international long distance telephone exchange comprising international toll lines incoming from exchanges in other countries, switching equipment accessible from said incoming toll lines and giving access to other exchanges within the same country, international toll lines accessible from said incoming toll lines and outgoing to exchanges in other countries, international operator positions, and discriminating means associated with said switching equipment, but not with said outgoing international toll lines, adapted to respond to a signal arriving over an incoming toll line to call in an international operator.

The invention will be clearly understood from the following description of one embodiment shown in the accompanying drawings in which—

Figures 1, 2, 4:
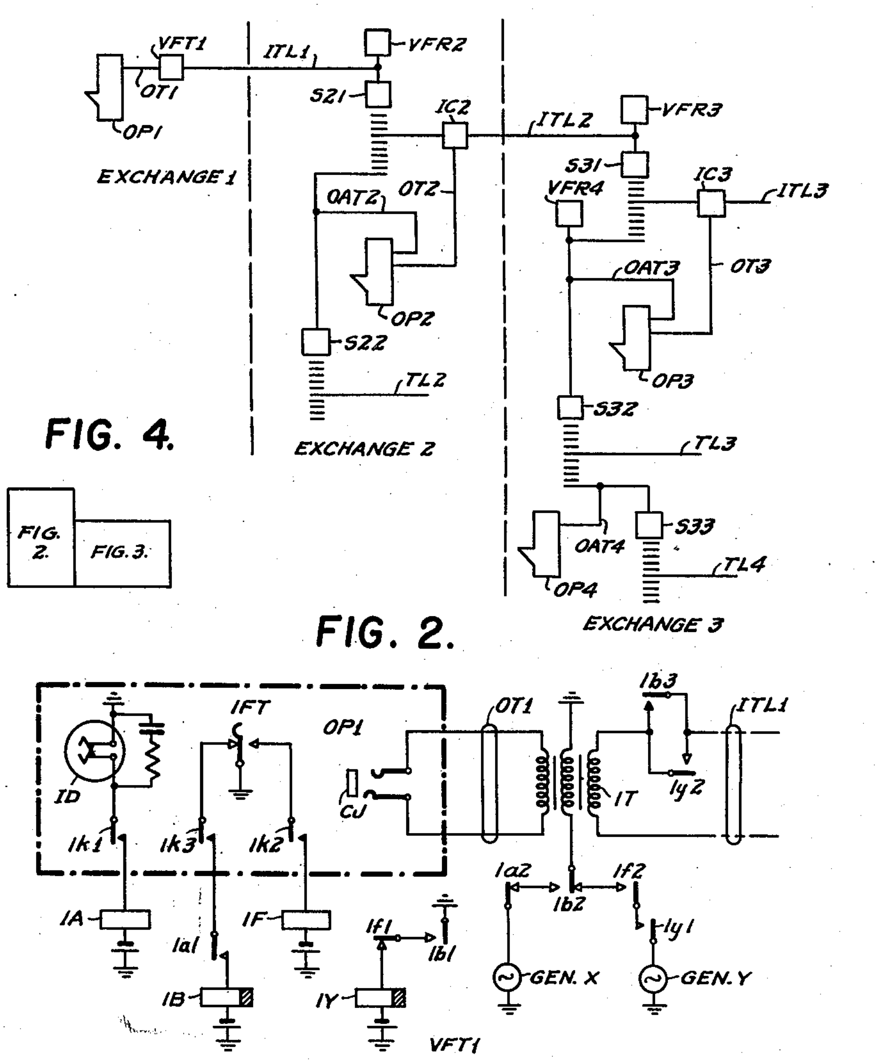

Fig. 1 is a schematic representation of certain switching elements involved in the setting up of an international connection.

Figure 3:
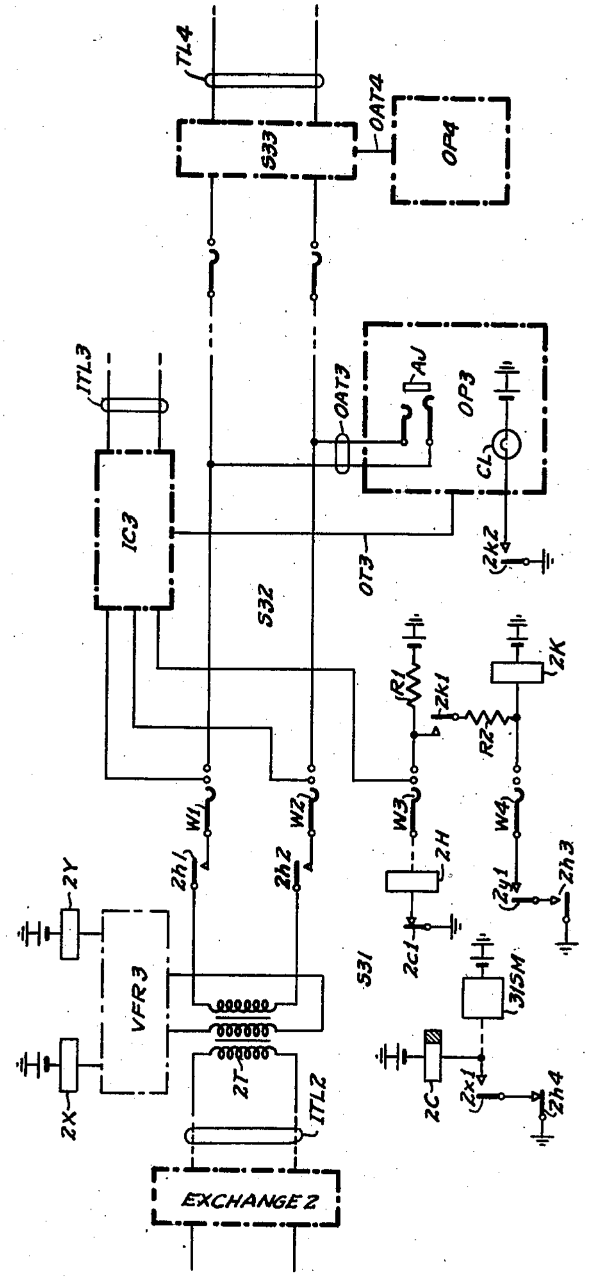

Fig. 2 shows the relevant portions of the circuits at an originating international exchange concerned with setting up an international connection and calling in an international operator at the terminating international exchange, while Fig. 3 shows portions of the circuits at a terminating international exchange for responding to a signal indicating that the assistance of an international operator at that exchange is required.

Fig. 4 shows how the drawings are to be juxtaposed in order to illustrate the invention.

The main purpose of this invention is to enable an operator at an originating exchange, for example "Exchange 1" (Fig. 1), to call in a particular one of a number of operators located along the route of a built-up connection established through an exchange, for example "Exchange 3," which is located in a different country from that of exchange 1, via an intervening exchange, for example "Exchange 2," which may be located in yet another country. One example of the use of the invention would occur in international telephony where an operator in the originating country desires to call an international operator in the terminating country without calling in an operator in an intermediate country through which the connection may have been set up. It is possible that the operator in the originating country may wish to obtain assistance although she has dialled, or by some other means transmitted, the appropriate numerical digits to reach the called subscriber. Such conditions can arise when the said operator experiences difficulty due to the language spoken by the called subscriber. It is not sufficient to call in any operator in the terminating country because the originating operator may not be able to speak the national language of the terminating country. If however an international operator is called in, language difficulties will be overcome. In the embodiment illustrated, the invention has been applied to a system in which dial impulses and other control signals are transmitted over toll lines by means of alternating currents at one or the other of two selected frequencies included within the frequency range of the voice; in such "two voice-frequency" signalling systems, the selected frequencies are commonly known as the "X" frequency and the "Y" frequency.

In Fig. 1, the operator position OP1 and the outgoing trunk OT1 and voice-frequency signal transmitter VFT1 associated with an inter-country toll line ITL1 are in an originating international exchange 1 in a first country; OP2 is an international operator position in an international exchange 2 in a second country; S21 is an incoming selector, conventionally representing, terminating the toll line ITL1; VFR2 is a voice-frequency signal receiver and relay set associated with the incoming end of the toll line ITL1; selector S21 has access over certain of its outlets to inter-country toll lines, such as toll line ITL2, having an outgoing relay set IC2 and leading to an international exchange 3 in a third country, and over others of its outlets to trunks leading to local selectors, such as selector S22, said trunks having an appearance on the international operator position OP2, via operator answering trunks such as trunk OAT2; selector S22 has access over certain of its outlets to intra-country toll lines, such as toll line TL2, leading to other exchanges in the said second country; the international operator at position OP2 may also be given access to the toll line ITL2, via trunks such as trunk OT2. OP3, S31, ITL2, VFR3, ITL3, IC3, S32, OAT3, TL3, and OT3 are corresponding elements position and circuit respectively in an international exchange 3 in a third country; selector S32 has access over certain of its outlets to intra-country toll lines, such as toll line TL3, and over others of its outlets to trunks leading to local selectors, such as selector S33, said trunks having an appearance on an operator position OP4, via operator answering trunks such as trunk OAT4; VFR4 is a voice-frequency signal receiver associated with the trunk leading to selector S32.

It is to be understood that the position OP3 is staffed by an international operator capable of giving assistance on a connection originating in another country, whereas the operator at position OP4 may not be so qualified; also that at exchange 2, there may be signal receivers, selectors, operator positions and trunks corresponding respectively to the elements VFR4, S33, OP4, OAT4 and TL4 at exchange 3.

The operator at position OP1, upon setting up a connection via toll line ITL1, selector S21, toll line ITL2, selectors S31, S32 and S33 and other selectors, not shown, to a subscriber in the third country, may experience language difficulty in conversing with him and may therefore desire to obtain the assistance of the international operator at position OP3. It is required that the signal which the operator at position OP1 uses to call in the operator at position OP3 shall not be effective at position OP2 or OP4.

Had the connection been set up via selectors S21 and S22 to a subscriber in the second country, then the operator at position OP1 would have wished to call in the operator at position OP2. Similarly, had the connection been set up via selectors S21, S31 and an inter-country toll line ITL3 to a subscriber in yet another country, the operator at position OP1 would have wished to call in an international operator in that country, rather than the operator at position OP3.

Figs. 2 and 3, when juxtaposed as indicated in Fig. 4, show means for calling in an international operator at position OP3 for a connection set up by an operator at position OP1 via selectors S21, S31, S32 and S33.

Fig. 2 shows the essential portions of the circuits at exchange 1. 1D are the impulse springs of a calling dial and 1FT is a forward call key, both forming part of the operator's equipment on position OP1; 1k1, 1k2, 1k3 indicate any conventional means for associating said operator's equipment with a voice-frequency signal transmitter VFT1 when connection is made with the outgoing trunk OT1 via the calling jack CJ; the signal transmitter includes transformer 1T and relays 1A, 1B, 1F and 1Y.

Relay 1A operates when contact 1k1 closes and the contact 1a1 closes an obvious circuit for relay 1B, which in turn closes a circuit for relay 1Y at 1b1. Relays 1B and 1Y prepare the forward signalling circuit over toll line ITL1 at 1b3 and 1y2.

When the dial is operated, relay A restores intermittently and connects the A. C. generator GEN. X via contacts 1a2 and 1b2 to the middle winding of transformer 1T, causing corresponding trains of current impulses at frequency X to be transmitted over toll line ITL1. Relay 1B is slow-to-release and remains operated during the trains of impulses. In accordance with well-known switching practices, these dial-controlled trains of impulses control successively the incoming selector S21 at the exchange 2, Fig. 1, to extend the connection to a toll line ITL2 leading to exchange 3, and thereafter the incoming selector S31 (as will be described in greater detail hereafter), the selectors S32 and S33 and other selectors, not shown, to select the wanted subscriber.

If the originating operator encounters language difficulty with the called subscriber, she can call in an international operator at the terminating international exchange by momentarily actuating the key 1FT. When the key 1FT is operated, relay 1B is released and relay 1F operates; the A. C. generator GEN. Y is connected via contacts 1y1, 1f2, 1b2 to transformer 1T until the slow-to-release relay 1Y is released by contact 1f1 and opens its contact 1y1, thus causing a single burst of current at frequency Y to be transmitted over toll line ITL1 to call in the desired operator.

Fig. 3 shows parts of the incoming selector S31, the local selector S32 and the operator position OP3 at the terminating international exchange 3. Voice-frequency signals transmitted as described from exchange 1 reach selector S31 via exchange 2 and toll line ITL2 and pass via transformer 2T into a voice-frequency signal receiver VFR3, which may be of any well known type which includes devices responsive to the signal frequencies X and Y. When a signal at frequency X is received, relay 2X operates, while a signal at frequency Y operates relay 2Y.

The first train of impulses at frequency X thus causes contact 2x1 to close a number of times and to operate the magnet 31SM of selector S31, raising the wipers W1, W2, W3, W4 to the bank level to which selector S32 is connected; relay 2C operates in parallel with magnet 31SM and, being slow-to-release, remains operated until the end of the train. When the impulses cease, relay 2C restores and the conventional hunting operation for a free outlet in the selected level follows; relay 2H operates in series with the resistor R1 in selector S32 when the outlet leading to this selector is reached; relay 2H extends the connection thereto at contacts 2h1 and 2h2.

The next train of impulses at frequency X causes selector S32, by means not shown, to extend the connection to selector S33 and the remaining trains cause the connection to be completed via toll line TL4 and other selectors to the wanted subscriber.

If now a pulse of current at frequency Y arrives over toll line ITL2, Fig. 3, relay 2Y operates and at contact 2y1 closes a circuit over wiper W4 for relay 2K in selector S32; relay 2K locks to ground at contact 2c1 via resistor R2, contact 2k1, wiper W3 and relay 2H, thus remaining operated after the cessation of the pulse. At contact 2k2, relay 2K closes a circuit for calling lamp CL to attract the attention of the operator at the international position OP3. The said operator can now enter the connection to give the desired assistance by plugging into the jack AJ connected to the operator answering trunk OAT2.

Had the connection been routed from selector S31, Fig. 3, to a toll trunk ITL3 leading to another country instead of to selector S32, exchange 3 would no longer have been the terminating international exchange in the connection and the operator at position OP3 would not have been called in by the Y frequency pulse passing through the relay set IC3, because said relay set is not provided with discriminating means, such as relay 2K in selector S32, connected to the bank contact on which wiper W4 would have been standing.

By the same token, with reference now to Fig. 1 and to the connection previously described, the Y frequency pulse, which operates a relay in selector S21 at exchange 2 as well as relay 2Y in selector S31 and which also passes through the relay set IC2, does not cause the operator at position OP2 to be called in, because said relay set is not provided with discriminating means for this purpose. Furthermore, the circuit with which position OP4 is associated does not possess such discriminating means and only an international operator and not a national operator at the terminating international exchange 3 is called in by the Y frequency pulse.

It will be understood that there may be a number of intermediate switching centers similar to exchange 2 between the originating and the terminating international exchanges, all of which will behave in the manner described for exchange 2.

I claim:

1. A system for establishing telephone connections between subscriber stations in different geographical areas, comprising an exchange in a first geographical area, an incoming selector in said exchange provided with a signal receiver, an inter-area toll line extending to said incoming selector, local selectors accessible to said incoming selector and having access to subscriber stations in said area, other inter-area toll lines accessible to said incoming selector and having access to subscriber stations in other areas, an operator position at said exchange having access to said local selectors and to said other toll lines, a calling device at said operator position, means controlled by said signal receiver responsive to signals of one character received over said toll line and adapted to extend a connection via said incoming selector to one of said subscriber stations, signalling means in said signal receiver responsive to a signal of another character received over said toll line, and discriminating means controlled by said incoming selector and effective only when said connection has been extended to one of said local selectors to cause said signalling means to operate said device.

2. A system was claimed in claim 1, wherein said signal receiver includes means for accepting alternating current signals, said signals of one character comprising trains of pulses at a frequency included in the frequency range of the voice, and said signal of another character comprising a pulse at another frequency included in said range.

3. A system for establishing telephone connections between subscriber stations in different geographical areas, comprising an exchange in a first geographical area having a first operator position, a second exchange in a second geographical area having an incoming selector, an inter-area toll line extending from said operator position to said incoming selector, local selectors accessible to said incoming selector and having access to subscriber stations in said second area, other inter-area toll lines accessible to said incoming selector and having access to subscriber stations in other areas, an operator position at said second exchange having access to said local selectors and to said other toll lines, a signalling device at said operator position at said second exchange, means at said first operator position for transmitting signals over said toll line to extend a connection via said incoming selector to one of said subscriber stations, means at said first operator position for thereafter transmitting a characteristic signal over said toll line, signalling means associated with said device, and discriminating means controlled by said incoming selector and effective only when said connection has been extended to one of said local selectors to render said signalling means responsive to said signal for operating said device.

4. A system as claimed in claim 3, wherein said signalling means comprises a relay associated with one of said local selectors and actuated in response to said characteristic signal.

5. A system as claimed in claim 4, further comprising means for maintaining said relay actuated after the cessation of said characteristic signal.

ESMOND PHILIP GOODWIN WRIGHT.

REFERENCES CITED

The following references are of record in the file of this patent:

UNITED STATES PATENTS

| Number | Name | Date |
|---|---|---|
| 1,883,589 | Crocker | Oct. 18, 1932 |
| 2,382,893 | McKim | Aug. 14, 1945 |